United States Patent [19]

Wagner

[11] Patent Number: 4,515,260

[45] Date of Patent: May 7, 1985

[54] ESCAPEMENT ORIENTING MECHANISM

[75] Inventor: David L. Wagner, Kent, Wash.

[73] Assignee: The Boeing Company, Seattle, Wash.

[21] Appl. No.: 479,379

[22] Filed: Mar. 28, 1983

[51] Int. Cl.³ .............................................. B65G 11/20
[52] U.S. Cl. ...................................... 193/44; 198/400;
221/171; 414/754; 414/786
[58] Field of Search .................... 414/754, 786; 193/44,
193/47; 198/388, 399, 400; 221/171, 172, 173

[56] References Cited

U.S. PATENT DOCUMENTS

| | | | |
|---|---|---|---|
| 2,623,803 | 12/1952 | Gamble | 193/44 |
| 2,662,626 | 12/1953 | Graham et al. | 221/173 |
| 3,533,534 | 12/1965 | Gaydon | 221/171 |
| 3,836,048 | 9/1974 | Lowe | 221/172 |

*Primary Examiner*—Leslie J. Paperner
*Assistant Examiner*—Lyle Kim

*Attorney, Agent, or Firm*—Morris A. Case; B. A. Donahue

[57] ABSTRACT

A guide bar reciprocally movable at an inclined angle accepts a fastener in an upper leg of the guide bar when in a retracted position, moves that fastener past a stationary member and drops it onto a lower leg of the guide bar when in the extended position. A movable pin contacts the lower end of the fastener and acts as a reference when that pin is in the extended position. The guide bar when it is retracted is at a distance less than the length of the fastener from the reference point. If the fastener, which has a shallow recess on one end and a deep recess on the other end, has the shallow recessed end down that end will drop down when the pin is retracted. If the deep recessed end is down the fastener will rotate around the pin and drop the shallow recessed end down.

4 Claims, 9 Drawing Figures

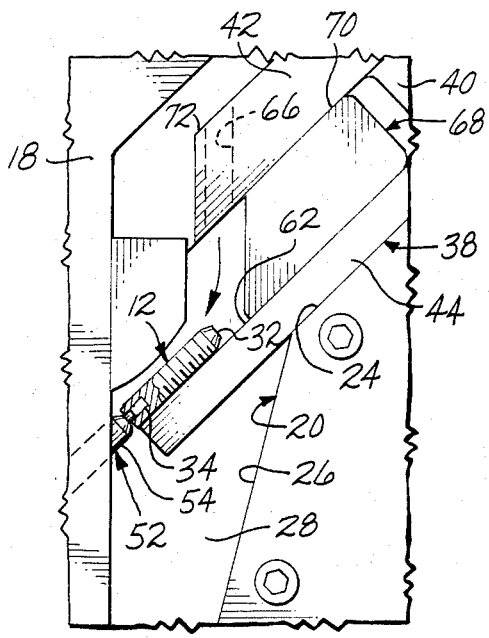
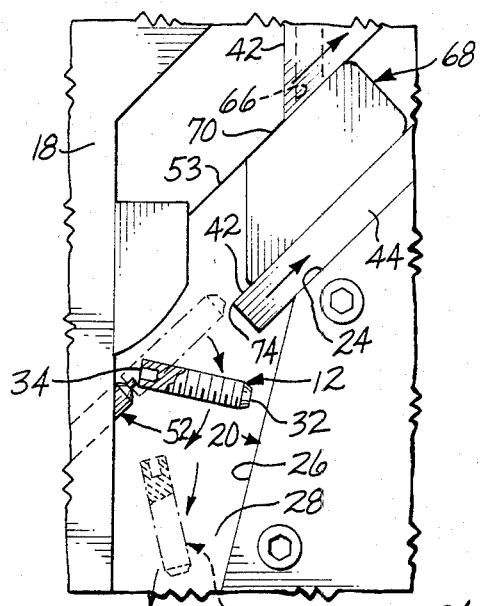
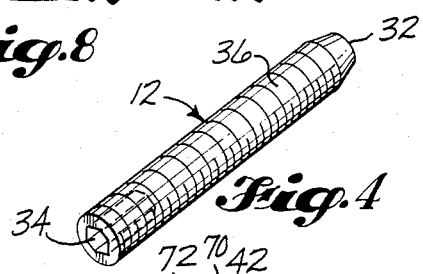
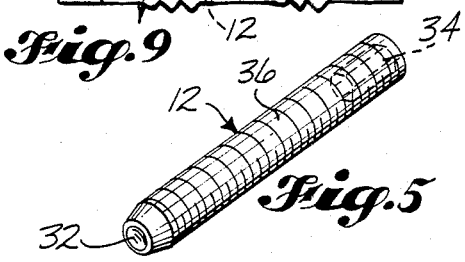
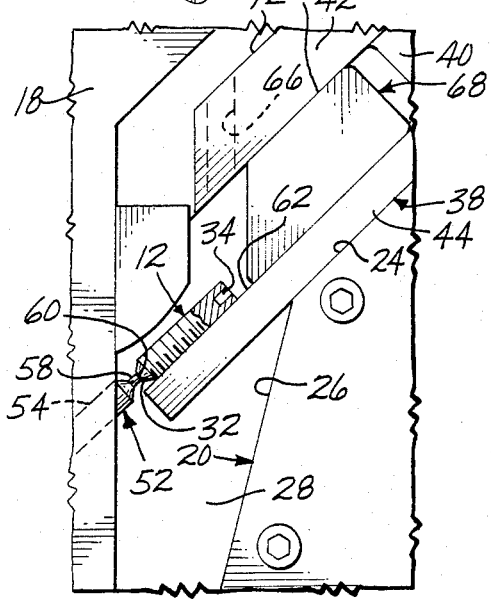
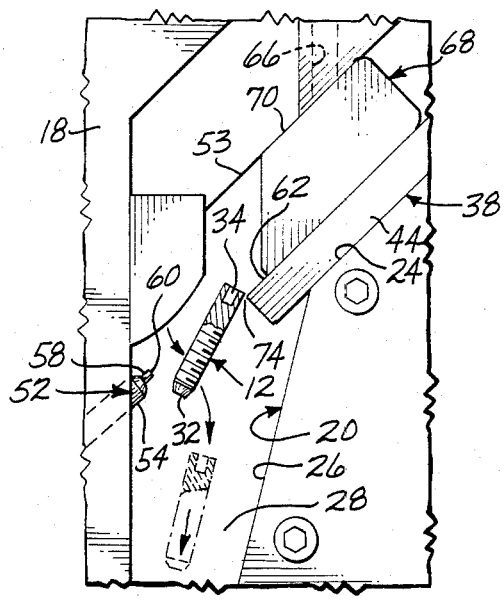

ESCAPEMENT ORIENTING MECHANISM

BACKGROUND OF THE INVENTION

In applications requiring the automatic setting of cylindrical shaped fasteners having a deep cavity in one end, one normally uses a vibrating bowl to feed the fasteners one after the other into a feed line. Those vibratory bowls do a good job, however, the fasteners are random oriented, and all must be oriented in one direction before reaching the automatic setting location. There are several known methods of orienting this type of fastener. One of those methods is to use an electric eddy current, and another one uses air jet sensing. In each of those methods a fastener properly oriented is accepted and an improperly oriented fastener is rejected. There also is a known gravity inertia orientor. It was found, however, that an orienting device having an exceptionally high percentage of properly oriented fasteners could be made when practicing this invention.

SUMMARY OF THE INVENTION

A U-shaped guide bar has leg ends extending downward at an angle. The topmost leg has a vertical opening sized to pass a fastener through the leg adjacent to the end. The end of the lower leg extends further to provide an inclined plane surface for supporting a fastener. A reciprocally movable pin is located when extended to contact and to be a reference point for the lower end of the fastener when it is supported on the inclined surface. When the guide bar is retracted the end fastener in a line of fasteners drops into the opening in the upper leg with the lower end resting against a stationary member. The guide bar extends forward until the fastener passes the stationary member and drops onto the inclined plane where its lower end now rests against the end of the movable pin. The guide bar is retracted to a position slightly less than the length of the fastener from the end of the pin. After a time delay the movable pin is rapidly retracted.

DESCRIPTION OF THE DRAWINGS

FIGS. 4 and 5 show perspective views from a different direction of the fastener oriented by this invention.

FIGS. 6 and 7 show fragmented blown up side elevational views as in FIGS. 2 and 3 with the shallow end of the fastener down.

FIGS. 8 and 9 show views as in FIGS. 6 and 7, but with the deep end of the fastener down.

DETAILED DESCRIPTION

Figure 1:
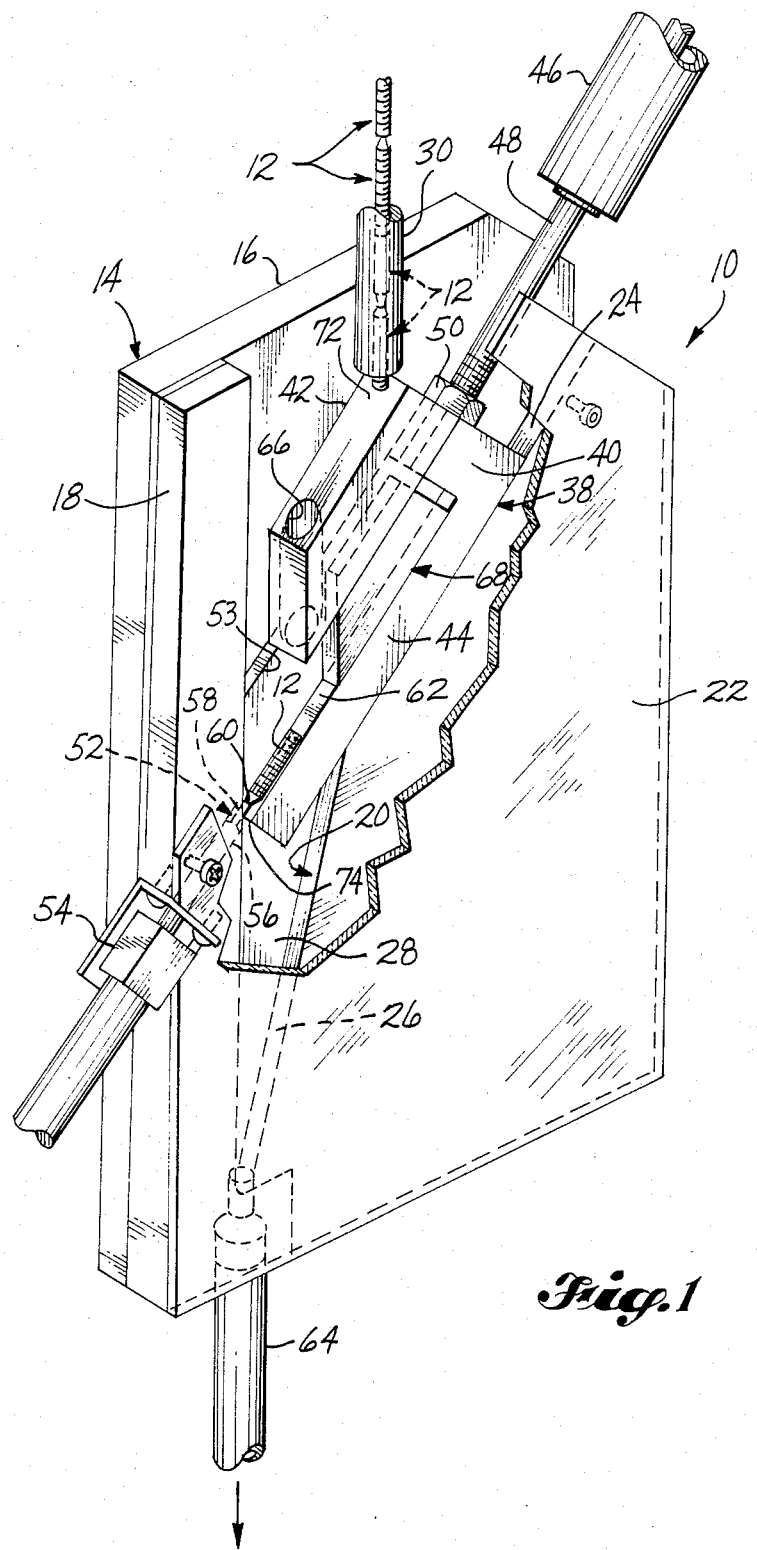
FIG. 1 shows a perspective view of the orienting operation of this invention.
Figure 3:
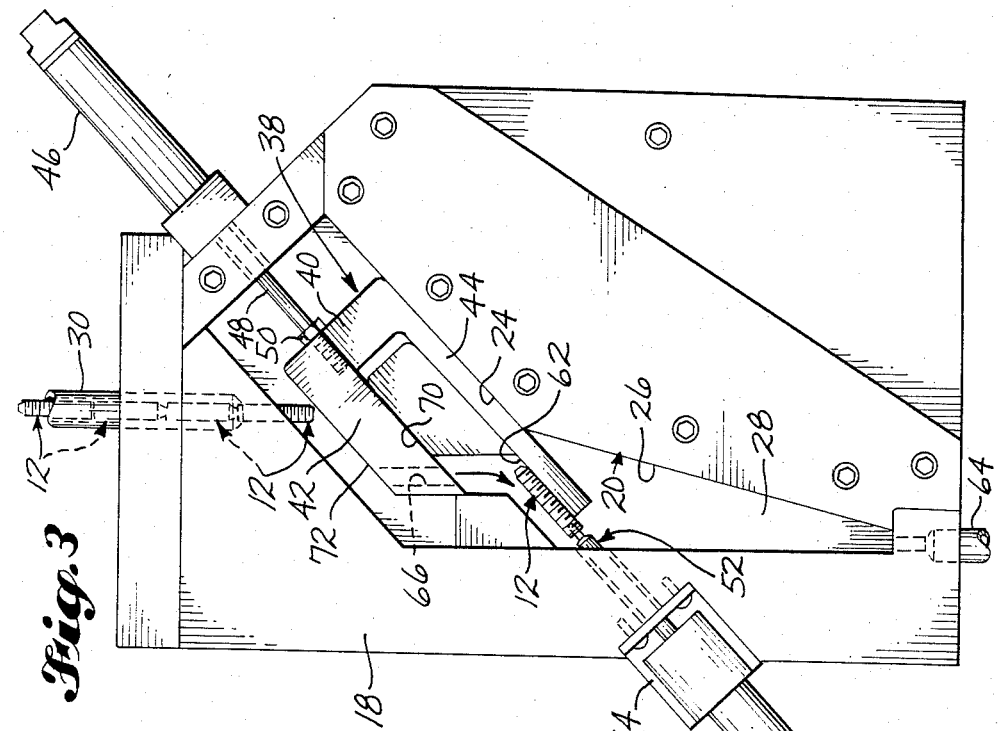
FIG. 3 shows a side elevational view as in FIG. 2 but with the guide bar advanced.
Figure 2:
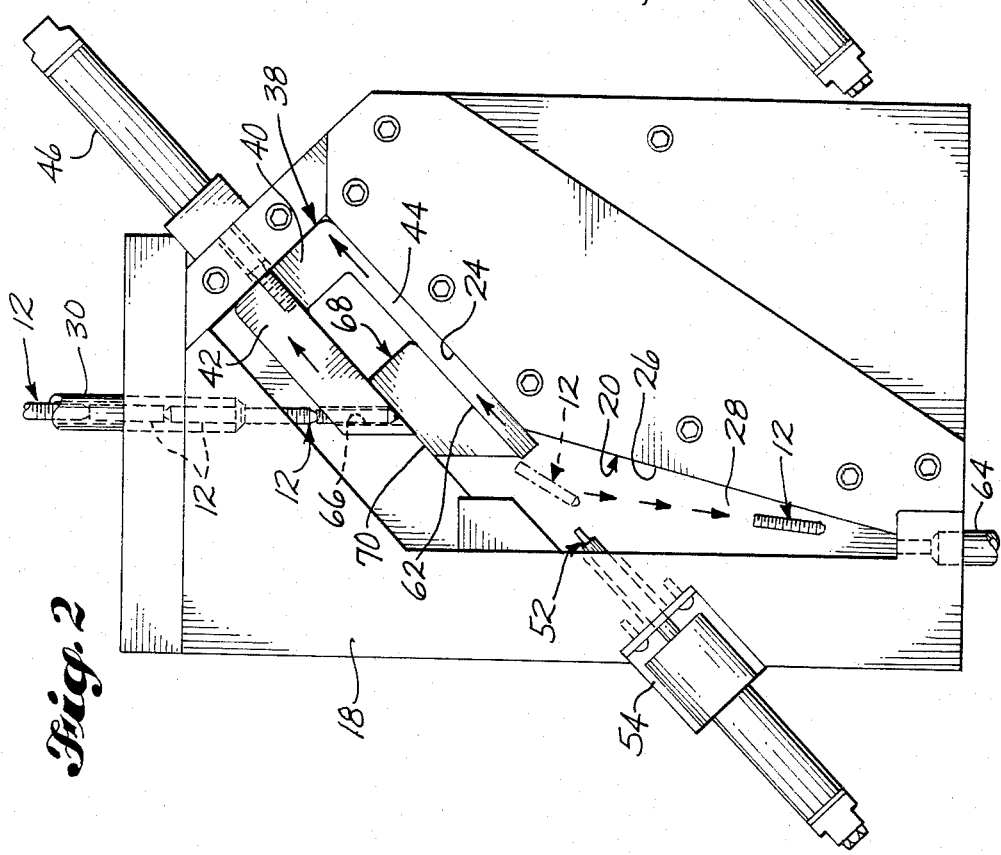
FIG. 2 shows a side elevational view of the invention of FIG. 1 with the guide bar retracted.

An escapement orientation mechanism 10, for the automatic aligning of fasteners 12, has a housing 14 made up of a backing plate 16, a vertical spacer bar 18, a shaped spacer 20 and a cover plate 22. The shaped spacer has an upper inclined plane surface 24 and a more steeply inclined surface 26. This steeply inclined surface in combination with the vertical spacer bar and the backing and cover plates form a chute 28 through which the fasteners can drop in a controlled manner. A feeder line 30, leads from an automatic feeder device, not shown, into the orientation mechanism. The fasteners in that feeder line are randomly oriented. These fasteners, which are best shown in FIGS. 4 and 5, have one end with a shallow cup shaped recess 32, the opposite end had a deep recess 34, such as, but not limited to, one used for a hex socket, and the fastener is threaded as 36.

A U-shaped guide bar 38 is reciprocally mounted inside the housing 14. That guide bar with base 40, upper leg 42 and lower leg 44 is joined at the base to an actuating cylinder 46 by a shaft 48 and nut 50. The open end of the guide bar is directed downward at an angle so that the legs are on an inclined plane.

A pin 52 is reciprocally mounted to an actuating cylinder 54. This pin has a diameter 56, as large as the diameter of the fastener 12, a reduced diameter 58 near the end and preferably a rounded tip 60. The pin is aligned to have a common axis with the axis of a fastener resting on surface 62 of the elongated lower leg 44.

Fastener egress line 64, is located to accept oriented fasteners 12 from the chute 28.

In operation, fasteners 12, are continuously introduced into feed line 30. Actuator cylinder 46 retracts the U-shaped guide bar 38 and the leading fastener falls into vertical opening 66 that extends through and is located adjacent to the end of the upper leg 42. A stationary block 68, located between the legs of the guide bar, catches the leading end of the fastener on upper surface 70 and retains the fastener in the opening. The guide bar is advanced. As the guide bar advances, the end of the next fastener in the feed line contacts surface 72 of the upper leg and holds all of the oncoming fasteners in place. The leading fastener, located in the opening of the upper leg, remains in that opening until the opening clears the stationary block at which time the fastener falls onto and is supported on the inclined plane surface 62 of lower leg 44 with the lower end of the fastener resting against the extended reciprocally mounted pin 52. The backing plate 16 and the cover plate 22 are each stepped inward just below the upper leg of the guide bar as shown at 53 in backing plate 16 of FIG. 1, to provide lateral support to the fastener once it drops out of vertical opening 66. The guide bar is then retracted, and after a short delay the pin is retracted. After another short delay the pin is again advanced in preparation for the next fastener to be aligned. When the guide bar is retraced by a predetermined amount, the distance from the end of the extended pin to the nearest end 74 of the lower leg 44 is a distance slightly less than the length of the fastener. At this time, one of two things happen to the fastener depending upon the orientation of that fastener. If the shallow recessed end of the fastener is down, the pin holds that end, and the opposite end is supported on the inclined surface 62 so the fastener remains in place. When the pin is rapidly retracted, the fastener rotates from its upper end and the fastener goes down the chute and into the outfeed line with the shallow end down. If the deep recessed end of the fastener is down, the smaller diameter part 58 of the pin enters into the recess and the other end of the fastener clears the leg 44; so the fastener rotates around the pin at the lower end, and again the fastener goes down the chute and into the outfeed line with the shallow end down. The chute is shaped to insure that the dropped fastener may only rotate one half of a revolution, so that the fastener remains properly oriented. As the process is repeated, each leading fastener is individually introduced into the orienting mechanism and the fasteners are all oriented in the same direction.

I claim:

1. An apparatus for aligning fasteners having a deep recess on one end and a shallow recess on the other end, with the apparatus comprising: means for introducing one fastener at a time onto a reciprocally movable inclined surface, a movable pin located to contact a lower end of the fastener, means for retracting the inclined surface a predetermined amount to clear the fastener to permit the fastener to rotate on the end of the pin into a shallow recessed end down position provided a deep recessed end of the fastener was resting on the pin and provided the shallow recessed end of the fastener was resting on the pin to support the fastener adjacent the other end, and means for rapidly retracting the pin to permit the shallow recessed end to drop down.

2. An apparatus for aligning fasteners having a deep recess on one end and a shallow recess on the other end, with the apparatus comprising: a stationary member at an inclined angle, a U-shaped guide bar slideably mounted around the stationary member with the open end downward at an inclined angle, an upper leg having an opening adjacent an end and aligned to accept a fastener from a continuous feed line when in a retracted position and to drop the fastener past the stationary member and onto an inclined upper surface of a lower leg when in an extended position, means for supporting a lower end of the fastener, means for retracting the guide bar to move the end of the lower leg a set distance from the lower end supporting means, and means for retracting the lower supporting means away from the fastener.

3. An apparatus, as in claim 2, for aligning fasteners having a deep recess on one end and a shallow recess on the other end and the means for supporting the lower end of the fastener comprises a pin aligned on a common axis with the fastener and having a small diameter adjacent the end.

4. A process for orienting a line of automatically fed fasteners having one shallow recessed end and a deep recess on the other end, with the steps comprising: introducing fasteners one at a time onto an inclined plane surface, establishing a reference point for the lower end of the fastener, moving the inclined plane surface away from the reference point for a distance slightly less than the length of the fastener, giving the fastener time for rotating around the reference point and positioning the shallow end down when the deep recessed end of the fastener is against the reference point, and rapidly retracting the reference point and dropping the shallow end down when that shallow end had been against the reference point prior to its being retracted.

* * * * *